United States Patent
Tetteh et al.

(10) Patent No.: US 9,332,399 B2
(45) Date of Patent: May 3, 2016

(54) JUST IN TIME LINK TRANSMISSION FOR A MULTI-FREQUENCY MULTI-RATE MULTI-TRANSCEIVER COMMUNICATION DEVICE

(71) Applicant: Raytheon BBN Technologies Corp., Cambridge, MA (US)

(72) Inventors: William Nii Tetteh, Cambridge, MA (US); Christophe Jean-Claude Merlin, Malden, MA (US); Keith William Manning, Arlington, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 14 days.

(21) Appl. No.: 13/744,149

(22) Filed: Jan. 17, 2013

(65) Prior Publication Data
US 2014/0198704 A1   Jul. 17, 2014

(51) Int. Cl.
*H04H 20/71* (2008.01)
*H04W 4/06* (2009.01)

(52) U.S. Cl.
CPC .......................................... *H04W 4/06* (2013.01)

(58) Field of Classification Search
CPC ........................................................ H04L 45/16
USPC ............................................ 370/390, 412–418
See application file for complete search history.

(56) References Cited

U.S. PATENT DOCUMENTS

| | | | | |
|---|---|---|---|---|
| 7,184,421 B1 * | 2/2007 | Liu | ....................... | H04L 12/189 370/254 |
| 2005/0157719 A1 * | 7/2005 | Robotham | ............ | H04L 12/185 370/390 |
| 2009/0116393 A1 * | 5/2009 | Hughes | ................ | H04L 45/122 370/238 |
| 2010/0056166 A1 * | 3/2010 | Tenny | .................... | H04H 20/42 455/450 |
| 2011/0170542 A1 * | 7/2011 | Liu | ......................... | H04L 12/18 370/390 |
| 2012/0307825 A1 * | 12/2012 | Hui | ....................... | H04W 28/14 370/390 |
| 2014/0064142 A1 * | 3/2014 | Mylarappa | ............ | H04W 40/02 370/254 |
| 2014/0198703 A1 | 7/2014 | Merlin et al. | | |
| 2014/0204823 A1 | 7/2014 | Merlin et al. | | |

OTHER PUBLICATIONS

"U.S. Appl. No. 13/744,115, Non Final Office Action mailed Jul. 21, 2014", 39 pgs.
"U.S. Appl. No. 13/744,133, Non Final Office Action mailed Aug. 28, 2014", 46 pgs.

(Continued)

*Primary Examiner* — Brandon Renner
*Assistant Examiner* — Voster Preval
(74) *Attorney, Agent, or Firm* — Schwegman Lundberg & Woessner, P.A.

(57) ABSTRACT

An apparatus includes a network node configured to communicate with other network nodes via a communication network. The network node includes a plurality of transceivers and a controller. The controller includes a packet management module that identifies a link profile solution set that includes a set of link profiles corresponding to communication links for multicasting the message packet. The link profile solution set maximizes coverage of network target nodes of the multicast message packet. The packet management module places a first message clone of the message packet in a transceiver queue for transmission to one or more of the network target nodes, updates the link profile solution set when the first message clone reaches the end of the transceiver queue, and initiates transmission of the first message clone or drop the first message clone according to the updated link profile solution set.

20 Claims, 3 Drawing Sheets

(56) References Cited

OTHER PUBLICATIONS

"U.S. Appl. No. 13/744,115, filed Mar. 17, 2015 to Final Office Action mailed Jan. 15, 2015", 14 pgs.
"U.S. Appl. No. 13/744,133, Final Office Action mailed Mar. 18, 2015", 53 pgs.
Chen, J., et al., "AMNP: ad hoc multichannel negotiation protocol for multihop mobile wireless networks", 2004 IEEE International Conference on Communications, vol. 6, (2004), 3607-3612.
Chen, Wen-Tsuen, et al., "TAMMAC: An Adaptive Multi-Channel MAC Protocol for MANETs", IEEE Transactions on Wireless Communications, 7(11), (Nov. 2008), 4541-4545.
Ding, Gang, "Performance evaluation of multiple-rate mobile ad hoc networks", Performance Evaluation, 63(11), (Nov. 2006), 1110-1126.
Haas, Z. J. et al., "Dual busy tone multiple access (DBTMA)—a multiple access control scheme for ad hoc networks", IEEE Transactions on Communications, 50(6), (Jun. 2002), 975-985.
Haykin, S., "Cognitive radio: brain-empowered wireless communications", IEEE Journal on Selected Areas in Communications, 23(2), (Feb. 2005), 201-220.
Holland, G., et al., "A rate-adaptive MAC protocol for multi-Hop wireless networks", MobiCom '01 Proceedings of the 7th annual international conference on Mobile computing and networking, (2001), 236-251.
Hsu, J. L. "Cross-Layer Multi-Rate Routing Strategies in Wireless Multi-Hop Random Access Networks", IEEE Global Telecommunications Conference, 2007. GLOBECOM '07., (2007), 609-613.
Jain, N., et al., "A multichannel CSMA MAC protocol with receiver-based channel selection for multihop wireless networks", Tenth International Conference on Computer Communications and Networks, 2001. Proceedings., (2001), 432-439.
Kamerman, A., et al., "WaveLAN®-II: a high-performance wireless LAN for the unlicensed band", Bell Labs Technical Journal, 2(3), (1997), 118-133.
Kyasanur, P., et al., "Routing and link-layer protocols for multi-channel multi-interface ad hoc wireless networks", Proceedings of Sigmobile Mobile Computing and Communications Review, vol. 10, (2006), 31-43.
Li, Y., et al., "MAC-SCC: medium access control with a seperate control channel for multihop wireless networks", 23rd International Conference on Distributed Computing Systems Workshops, 2003, Proceedings., (2003), 764-769.
Lin, Cheng-Shien, et al., "Concurrent Multi-Channel Transmission (CMCT) MAC Protocol in Wireless Mobile Ad Hoc Networks", The 9th International Conference on Advanced Communication Technology, vol. 1, (2007), 445-449.
Lymberopoulos, D., et al., "Towards Energy Efficient Design of Multi-radio Platforms for Wireless Sensor Networks", International Conference on Information Processing in Sensor Networks, 2008. IPSN '08., (2008), 257-268.
Mangold. S., et al., "IEEE 801.11e Wireless LAN for Quality of Service", Proceedings European Wireless 2002, (2002), 8 pgs.
Nguyen, U. T, et al., "Multirate-aware Multicast Routing in MANETs", 2006 IEEE International Conference on Mobile Adhoc and Sensor Systems (MASS),, (2006), 554-557.
Numanoglu, Tolga, et al., "Multi-rate support for network-wide broadcasting in MANETs", Proceeding—Networking'07 Proceedings of the 6th international IFIP-TC6 conference on Ad Hoc and sensor networks, wireless networks, next generation internet, (2007), 1140-1144.
Pering, Trevor, "CoolSpots: Reducing the Power Consumption of Wireless Mobile Devices with Multiple Radio Interfaces", Proceedings of the 4th ACM International Conference on Mobile Systems, Applications and Services (MobiSys'06), (2006), 220-232.
Qiao, D., et al., "MiSer: an optimal low-energy transmission strategy for IEEE 801.11a/h", MobiCom '03 Proceedings of the 9th annual international conference on Mobile computing and networking, (2003), 161-175.
Redi, J., et al., "The DARPA WNaN network architecture", Military Communications Conference (MILCOM'11), (2011), 2258-2263.
Roy, S., et al., "Using minimal source trees for on-demand routing in ad hoc networks", IEEE INFOCOM 2001. Twentieth Annual Joint Conference of the IEEE Computer and Communications Societies. Proceedings, vol. 2, (2001), 1172-1181.
Torrieri, D. J. "Mobile frequency-hopping CDMA systems", IEEE Transactions on Communications, 48(8), (Aug. 2000), 1318-1327.
Vassis, D., et al., "The IEEE 802.11g standard for high data rate WLANs", IEEE Network Magazine of Global Internetworking, 19(3), (May 2005), 21-26.
Wu, S. L, et al., "A Multi-channel MAC Protocol with Power Control for Multi-hop Mobile Ad Hoc Networks", The Computer Journal, 45(1), (2002), 101-110.
Xiao, L., et al., "Jamming-Resistant Collaborative Broadcast Using Uncoordinated Frequency Hopping", IEEE Transactions on Information Forensics and Security. 7(1). (Feb. 2012), 297-309.
"U.S. Appl. No. 13/744,115, Final Office Action mailed Jan. 15, 2015", 38 pgs.
"U.S. Appl. No. 13/744,115, filed Oct. 21, 2014 to Non Final Office Action mailed Jul. 21, 2014", 13 pgs.
"U.S. Appl. No. 13/744,133, filed Nov. 24, 2014 to Non Final Office Action mailed Aug. 28, 2014", 12 pgs.

* cited by examiner

JUST IN TIME LINK TRANSMISSION FOR A MULTI-FREQUENCY MULTI-RATE MULTI-TRANSCEIVER COMMUNICATION DEVICE

GOVERNMENT RIGHTS

This invention was made with United States Government support under Contract Number FA8750-11-C-0201. The United States Government has certain rights in this invention.

RELATED APPLICATION

This application is related to U.S. patent application Ser. No. 13/744,115, filed Jan. 17, 2013, titled "Interface and Link Selection for a Multi-Frequency Multi-Rate Multi-Transceiver Communications Device" (attorney docket no. 3547.O09USI), and to U.S. patent application Ser. No. 13/744,133, filed Jan. 17, 2013, titled "Multiple Parallel Link Transmissions for a Multi-Frequency Multi-Rate Multi-Transceiver Communications Device" (attorney docket no. 3547.010US1), both of which are filed concurrently herewith.

TECHNICAL FIELD

Embodiments pertain to communication systems. Some embodiments relate to a communication network of multi-transceiver network nodes.

BACKGROUND

There is continued demand to improve the performance of wireless (e.g., radio frequency or RF) communication networks. For example, military applications can require multicast transmissions of video information. Multicast transmissions are messages that are transmitted simultaneously to many target nodes from one source node. In contrast, unicast transmissions are point-to-point from node-to-node. The requirements of these multicast transmissions impose significant demands on network capacity and delay in delivery.

One way to improve network capacity is to use network communication nodes that have multiple transceivers, or a multi-transceiver system. A multi-transceiver system often involves a dedicated signaling channel and N≥1 data channels. All nodes of the system typically assign the same signaling channel, which is intended for control packets. If a node has more than one data link to its next-hop target, it may use the channel with the highest signal-to-interference noise ratio (SINR) or the next idle channel. However, one issue with present multi-transceiver systems is that they typically focus solely on unicast message traffic and do not accommodate broadcast or multicast traffic. Broadcast traffic refers to transmitting information received by every node on the network. Multicast traffic refers to transmitting information to multiple nodes on the network simultaneously, but to less than all nodes. For systems with protocols that do accommodate broadcast traffic, the broadcast traffic is typically sent using the dedicated signaling channel or control channel. This can limit the scalability of the network and reduce efficiency of network node use.

Thus there are general needs for systems and methods that improve communication network throughput and reduce communication delay while improving network robustness.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As explained previously herein, there are advantages to implementing a multi-transceiver network to improve network throughput. Some networks provide for frequency-hopping that allows a node to leverage multiple frequencies and avoid jammed or busy channels. However, frequency hopping is usually limited to unicast transmissions and is dedicated between a single transceiver at the source and a single transceiver at the target.

Some networks, such as military application networks, need to be quickly deployable self-building and adaptable. Communication devices can use different communication interfaces such as Bluetooth™, WiFi, Cellular 3G and 4G networks, GPS etc. It is desirable for non-homogenous transceivers to communicate with different neighbor nodes, and implement frequency-hopping using different neighbor nodes and different communication channels. It is also desirable for network nodes to be able to adapt to a changing network.

Network Architecture

Figure 1:
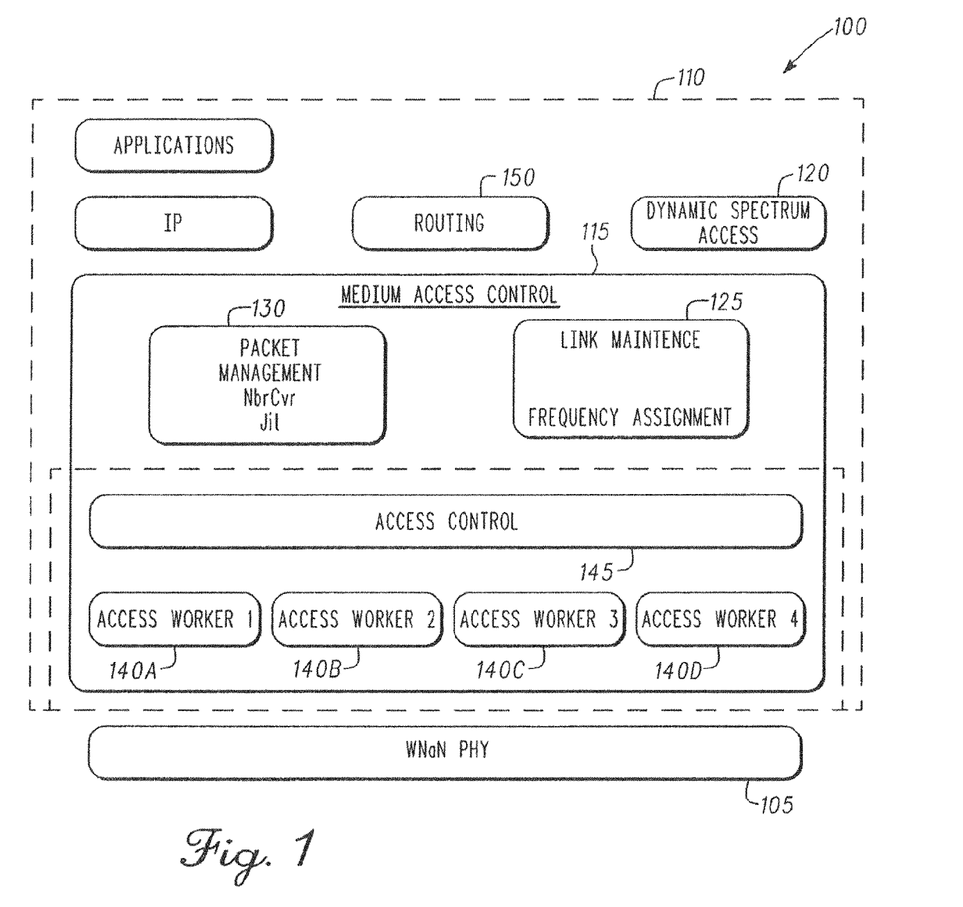
FIG. 1 is a block diagram of portions of an example of a network node of a wireless communications network in accordance with some embodiments.

FIG. 1 is a block diagram of portions of an example of a network node 100 of a wireless communications network. In some examples, the network node 100 can be included in a cellular telephone. In some examples, the network node 100 is included in a wide area communications network. In certain examples, the WAN include portable communication devices. In certain example, the WAN is implementable for battlefield applications.

The network node 100 communicates with other network nodes via the communication network. The physical layer or PHY layer 105 includes a plurality of wireless transceivers (not shown). The network node 100 also includes a controller 110. The controller 110 can include modules and sub-modules to perform the functions described. A module can include hardware, firmware, or software or combinations of hardware, firmware, and software. The controller 110 can include a processor such as a microprocessor or other type of processor to perform software or firmware instructions.

The controller 110 includes a medium access control (MAC) module 115 to control access to communication channels via the transceivers. MAC module 115 interfaces to a dynamic spectrum access (DSA) module 120. The DSA module detects or finds acceptable frequencies for communication and evacuates channels where non-cooperative signals (NCs) are detected. Examples of NCs include jamming signals or noise. The DSA module 120 can reconstitute a network topology to avoid NCs and can make the network free of NCs.

The MAC module 115 includes a link maintenance (LM) module 125. The LM module 125 performs neighbor node discovery across frequencies and data rates and creates links on which to reach neighbor nodes. The LM module 125 of the network node 100 can include a frequency assignment (FA) sub-module (not shown) to assign frequencies or channels to the multiple transceivers to maintain a connected network.

The MAC module 115 also includes a packet management (PM) module 130. The PM module 130 provides a point of interface to a Routing module 150 for message packet routing, queue management and message aggregation. The PM module 130 also determines a set of links that are used to reach the next-hop targets for frequency hopping. The Access module 135 arbitrates access to the channel using a variation of Carrier Sense Multiple Access with optional Collision Avoidance (CSMA/CA). Each transceiver of the multiple transceivers is controlled by a separate Access Worker sub-module or thread 140A-D. The group of worker threads is coordinated by an Access Controller sub-module or thread 1115.

A challenge is to find the best combination of transceivers on which to send multicast or broadcast packets.

A. Dynamic Spectrum Access

The nodes of the network can be cognitive radios that form a self-constructing network that can operate in the presence of NCs. The DSA module 120 provides frequency channels (and their bandwidth) for assignment by the MAC module 115 while conforming to the regulatory policy of the network. Reasoning by cognitive radio refers to interpreting regulatory policy and results from channel sensing to determine whether a frequency can be used for communication. Channelization by cognitive radio refers to creating usable channels out of ranges of frequencies determined by the Reasoning. In order to provide service under the presence of NC conditions, jammed frequencies are detected and evacuated in an orderly manner. Sensing by cognitive radio refers to quieting the nodes within a two-hop node radius and listening for activity on the communication medium. The results of Sensing are passed to Detection for spectrum evaluation and identification of NCs. Finally, Evacuation and Reconstitution by cognitive radio is responsible for abandoning a jammed channel and connection of a network node on undisturbed communication channels. In some examples, the DSA module 120 performs the Reasoning and the Detection functions of cognitive radio, and the MAC module 115 can include a Channelization sub-module, a Sensing sub-module and an Evacuation and Reconstitution sub-module to perform those functions of cognitive radio. Other divisions of the functions of cognitive radio are possible.

1) Reasoning: The DSA module 120 chooses frequencies to use for communications while conforming to a regulatory policy. The regulatory policy can be an ontology describing which frequencies may be authorized for a given geographical area or within a regulatory domain. The regulatory policy may be complex and can change with time. The network node 100 listens for other authorized users (called "primary users" or "non-cooperative users"), and refrains from transmitting on the frequencies if the users are present. Reasoning may include parsing one or more of the regulatory policy, NC detection and physical characteristics of a channel to determine and prioritize frequencies that may be assigned by the MAC module 115.

2) Channelization: The Channelization sub-module may break down frequency ranges into channels (e.g., a center frequency and a bandwidth) that can be assigned to physical multiple transceivers. The Channelization sub-module may ensure that the maximum number of non-overlapping non-interfering channels can be created out of the available frequencies.

3) Sensing: At the core of cognitive radio is a key component of a regulatory policy that proposes that a spectrum or section of spectrum be used on a secondary basis when the primary user is not using it. Thus, the Sensing function of cognitive radio checks for active primary users and other non-cooperatives. The DSA module 120 may send requests to the MAC module 115 to schedule sensing time. For each sensing interval, the DSA module 120 may provide a list of channels to sense and the sensors to be used. The MAC module 115 may hush the frequencies that are in use within a two-hop radius of the network node 100. To hush the frequencies, the MAC module 115 may broadcast control messages called Defer To Sense (DTS), which may indicate the time to the next sensing period and the duration of the sensing. Network nodes may try to coordinate their sensing periods to increase channel utilization. Finally, the MAC module 115 engages the sensors whose results are then passed to the Detection by the DSA module 120 for spectrum evaluation.

4) Detection: The DSA module 120 uses the sensing results to determine whether a channel should be evacuated. The DSA module 120 may examine energy in either large swaths of spectrum or narrow bands and may characterize non-cooperative signals (i.e., non-network nodes, primary/legacy users of the spectrum, jammers), network node chatter and the channel's noise floor.

5) Evacuation and Reconstitution: As a result of performing Sensing and Detection, the DSA module 120 creates and maintains a dynamic list of channels for the MAC module 115 to assign to transceivers. When a previously allowed channel becomes disallowed due to a non-cooperative, the MAC module 115 is immediately informed so that Evacuation and Reconstitution can be performed. The Evacuation and Reconstitution sub-module performs these tasks when a frequency is removed from use. A key part of Reconstitution is to provide multiple channels to the MAC module 115 and to perform robust connectivity so that the loss of any channel does not partition the network. Only systems with multiple transceiver nodes can provide continuous network connectivity at a time of Evacuation. Special control packets sometimes referred to as Heartbeats or Beacons can carry the necessary connectivity information between network nodes.

B. Link Maintenance (LM)

The LM module 125 may perform one or more of discovering new directly reachable nodes (sometimes called "neighbors"), dynamically assigning frequencies to transceivers, tracking the communication links to neighbors available on those frequencies and advertising the communication link status to the Routing module 150 for packet routing. The LM module 125 can include an FA sub-module. The FA sub-module can assign multiple frequencies to each network node, which can greatly increase network capacity.

1) Frequency Assignment in Multi-Transceiver Systems: The FA sub-module may assign distinct frequency channels to each available transceiver in a manner that achieves the desired network connectivity and network properties. This allows the network to adapt the assignments to the dynamics of the network neighborhood and of Non-Cooperative signals (NCs), and facilitates blind neighbor discovery.

When the network node 100 is activated, it may first attempt to discover other nodes and their frequency assignments. The FA sub-module may start this process by "soft-assigning" the first available transceiver to a randomly chosen frequency and sending periodic probe messages. Between sending the probe messages, the network node may listen for message packets from neighbors while cycling through its available frequencies (e.g., "scanning"). Network nodes may exchange information about their frequencies and assignments through Heartbeat messages. After a network node discovers its neighbors and learns their assignments, it "hard-assigns" the first transceiver to the eligible channel (as defined by the eligibility functions discussed below herein) with the most potential neighbors.

The FA sub-module may perform a channel selection algorithm using different eligibility functions, and using the different eligibility functions results in different network topologies. The purpose of channel eligibility is to decide which channels are eligible for assignment according to a given or specified design constraint. The different eligibility functions can be designed and implemented such that one eligibility function may be replaced with another eligibility function without affecting the rest of the functions of the FA sub-module. Some examples of eligibility functions include a Clique Eligibility Function, a Tile Eligibility function and a Blanket Eligibility Function.

The Clique Eligibility Function provides topological frequency separation. A channel C is deemed to be an ineligible channel if another transceiver has already been assigned the channel, or if such an assignment would result in a two-hop path involving nodes X-Y-Z, where all three nodes have channel C as one of their transceiver assignments. Identifying Cliques of nodes where the nodes cannot all be assigned a specific channel eliminates hidden terminations because there are no situations where a node that is two hops away is sharing the same frequency. However, forming Clique Eligibility can result in a disadvantage in multi-rate network environments where only one frequency per transceiver of a Clique can be assigned within an area equal to a lowest data rate (LDR) communication range, because the LDR communication range often includes the whole network.

The Tile Eligibility Function spreads neighbors among available transceivers. The channel C is deemed eligible if the number of one-hop neighbors using C is less than the tile size. The tile size is defined as a network node's number of neighbors divided by its number of transceivers. As neighbors appear and disappear, a network node's tile size may change over time. There can be a trade-off between updating transceiver assignments to the top eligible or most desirable channel and the cost of un-assigning and re-assigning channels on a transceiver. The algorithm of the Tile Eligibility Function is designed to update a transceiver channel assignment only if the neighborhood changes beyond a predetermined threshold (e.g., a number of channels of neighbor nodes are changed that exceeds a channel change threshold).

The Blanket Eligibility Function is designed to ensure end-to-end connectivity. When using Cliques or Tiles, with a limited number of frequencies and a limited number of transceivers, the network may become partitioned. To avoid this, one transceiver can be assigned a "Blanket" channel. The Blanket assignment, usually to the channel with the best RF properties, attempts to dynamically find a common frequency across all neighbors and by extension across the whole network. This is not a predetermined frequency, but merely a common channel to the neighbors. The communication network will still work if there is no assigned Blanket channel, because the network can still be connected with transceivers assigned only through Clique or Tile Eligibility.

The FA sub-module can also perform an Evacuation and Reconstitution function. The evacuation and reconstitution procedure can be executed whenever a Non Cooperative (NC) (e.g. a jammer) occupies a channel. The procedure of evacuation and reconstitution can include assigning the transceiver that is on a jammed frequency a new allowed channel and communicating the channel switch to neighbors through Heartbeat messages.

2) Neighbor and Link Maintenance in Multi-Frequency Systems: The LM module 125 may perform a second task to manage relationships with neighbors and the communication links on which to reach the neighbors. The concurrent assignment of multiple transceivers of a network node often means that one neighbor can be reachable via two or more channels. The LM module 125 can differentiate and characterize these links by creating link profiles, which are a unique parameterized description of the communication link. A link profile indicates link characteristics of a communication link and can include one or more of an indication of communication channel frequency, target node coverage by the communication channel, data rate of the communication, and the bandwidth of the communication channel. Link profiles can provide an abstract representation of the communication channel, data rate, even interface (e.g., neighbor nodes), that allows a multi-frequency, multi-rate and multi-transceiver network node to compare and work with very different entities.

The LM module 125 can discover and bring up neighbors of the network node 100 on certain link profiles if the communication link is bidirectional and stable. Heartbeat messages can be used to determine bi-directionality of the link and the current status of the link (e.g., the link being up, down or attempting to come up). A Heartbeat message can list a network node's neighbors, the transceiver assignments of the neighbors and their link status to them. The LM module 125 can use a received Heartbeat to bestow a configurable number of "points" to the status of the communication link. The number of points bestowed during a configurable (e.g., programmable) window can be used as a "score" that is compared against one or more of an up threshold score and a down threshold score to estimate link stability and determine link status. In addition, link quality to individual neighbors can be scored based on quantized Heartbeat received signal strength indication (RSSI), which is itself based on the physics of individual frequencies and the environment.

The LM module 125 can calculate a link cost to communicating to a neighbor using one or more of determined link quality, data rate and whether the neighbor has a Blanket channel assignment. The LM module 125 may assign a higher link profile cost to LDR links than high data rate (HDR) links because LDR transmissions incur significantly more contention than HDR transmissions. The LM module 125 may assign a greater cost to a Blanket channel link in anticipation that the Blanket channel link experiences greater contention than other links. Thus, for the Blanket channel case, the LM module 125 assigns a higher cost to a link profile that provides coverage to all neighbor nodes and assigns lower cost to a link profile with coverage to less than all of the neighbor nodes.

The LM module 125 may maintain one or more tables of neighbors and link profiles. These tables may include cross-reference information of link profile costs to neighbors. The minimum link cost to each neighbor can be shared with the Routing module 150 that is primarily concerned with finding the cheapest route to all destinations in the network. In some examples, the LM module 125 can share information about every link to each direct neighbor with the Packet Management module 130 that maps message packet one-hop target nodes to the assigned transceivers.

3) Link and Route Maintenance in Multi-Rate Systems:
a) Hello Messages: In multiple data rate systems, network nodes may maintain several link profiles to each one of their neighbors. Heartbeat messages typically fill the role of determining the characteristics of the link profiles, but Heartbeat messages can increase in size with network density. Maintenance of LDR links poses a problem of scalability for dense networks: each node within LDR range may send Heartbeat messages that can become large and which are transmitted at low data rate. To improve scalability of the network, the network node 100 can intersperse "Hello" messages with Heartbeat message. Hello messages are shortened Heartbeat messages that can be used to score link stability, while Heartbeat messages provide additional information regarding link bi-directionality. In some examples, the LM module 125 sends a Heartbeat message for a specified (e.g., programmed) multiple of the Hello message transmission period.

b) Link State Routing: By interleaving of Heartbeat messages with Hello messages, the Heartbeat messages are largely scalable because they can be broadcast to only one-hop neighbors. Adopting a Link State routing protocol in the network allows Heartbeat messages to be used for many annex purposes, such as link quality estimation, frequency assignments and neighbor node discovery. Link State routing may periodically flood link profile costs to build a view of the entire network. With the link profile cost information, each network node can perform a shortest-path algorithm and construct a tree to reach every target node destination at lowest cost, whether the costing is assessed by the hop count or by another metric such as data rate.

C. Packet Management (PM)

A message packet received at the network node 100 may identify the transmission mode (e.g., unicast, multicast, or broadcast) for transmitting the message packet from the network node 100, and may identify the target nodes for the transmission. All message packets outgoing from the network node 100, originated at the MAC module 115 or otherwise, are handed to the PM module 130, which manages priority queues for each transceiver. The PM module 130 interacts with the Access Controller thread 145 to which it feeds the next packets to be transmitted on each transceiver.

1) PM Queues: Each transceiver is allocated a priority queue made of p FIFO buffers, where p is a positive integer and is the number of packet priorities defined in the system. For instance, the network may define ten priorities and Heartbeats/Hellos are given a higher priority for transmission than video traffic. The length of the priority queues can be configurable and can be specified such that the inherent delays at underlying layers (e.g., Access Controller, Access Worker and PHY layers) are abstracted. Packets waiting to be transmitted in the priority queue can also be aggregated by the PM module 130.

2) PM's Neighbor Cover (NbrCvr): The PM module can map a message packet's next-hop target nodes to a set of link profiles assigned to the network node's transceivers. This task is handled by the NbrCvr process of the PM module 130. Multicast packets are particularly challenging because there usually exists more than one set of link profiles to cover all targets. The PM module 130 identifies a link profile solution set that includes a set of link profiles corresponding to communication links such as for multicasting of the message packet. The link profile solution set minimizes a certain cost function while maximizing coverage of all the network node targets. Identifying the solution set is akin to a solving a constrained set cover problem that is NP-complete. Constraints on the solution reflect the nature of multi-frequency, multi-rate, multi-transceiver networks. For instance, link profiles of LDR links may cover many or all target nodes but are highly undesirable from a channel access perspective because they can increase contention. The NbrCvr process of the PM module 130 receives the list of neighbors, link profiles and link costs from the LM module 125 and may use a greedy algorithm to determine the best link solution set to reach the next-hop target nodes.

Figure 2:
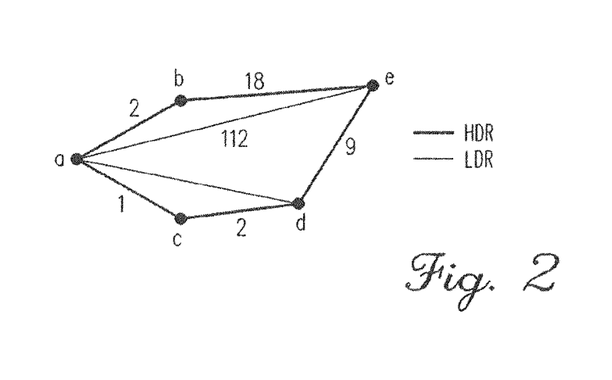
FIG. 2 illustrates an example of message packet routing in accordance with some embodiments.

FIG. 2 illustrates an example of message packet routing taking into account multiple data rates of available communication links. In the Figure, HDR links (a-b), (a-c), (c-d), (b-e) and (d-e) are assigned lower link profile costs than LDR links (a-d) and (a-e) because of LDR contention. The example shows the case when a network node (u) has a LDR-only neighbor node (e) that it can also reach through a multi-hop HDR route. Node (a) will originate and send LSUs even though it has no use for the LDR link as it will route unicast packet messages through the lower profile cost multi-hop route of (a-c-d-e).

The PM module 130 maps the link profiles of the link profile solution set to at least a portion of the plurality of transceivers, and initiates transmission of the message packet using the communication links corresponding to the link profile solution set. The PM module 130 may clone the original message packet to go out on different communication links, and may track the clone and parent packet transmissions.

3) PM's Just-in-Time (JIT):

A clone of a message packet may spend significant time enqueued in one or more transceiver queues if the packet load is greater than MAC capacity or if the local network around a node is experiencing contention or broken connectivity. By the time a clone is going out on a transceiver, the local network and therefore the link profile solution set for the clone may have changed. For example, the local network may change because a target node may no longer be a direct neighbor of the network node 100, a target node may be reachable using a different link profile, or a link profile may have been assigned to a different transceiver. In typical frequency-hopping systems or in typical multi-transceiver systems, these events could cause unnecessary message retransmissions, could increase delays, and reduce packet deliveries.

In order to ensure that clones are still valid at the time they are committed to transmission by the Access module 135, the queues for the transceivers can be split into multiple priority queues, such as a long and short set of priority queues or a set of first-level queues and a set of second-level queues. Clones of messages can be first placed in the first level (e.g., long) queues where they may experience a delay in being sent. A JIT process of the PM module 130 performs a second NbrCvr algorithm look-up (the "JIT look-up") when a clone reaches the bottom of its first-level or long queue. The mapping of transmission of the clones to transceivers is updated according to the latest link profile solution set before transmission of the clones is initiated. Transmission of the clones can be initiated when they are placed in the second-level (e.g., short) queue from where they will not be removed until their imminent transmission using the Access module 135 and the PHY layer 105. Although the priority queues have been described in terms of short queues and long queues, the methods would still be valid if the transceivers were assigned two queues of similar size or capacity. In some embodiments, a long queue can be bypassed to speed up transmission of a message packet or for debugging purposes.

Tracking of the clones, the target nodes, the link profiles, and the transceivers is particularly challenging in a network environment with broadcast traffic. Message packets may have multiple targets and may be broken into various clones that may go out on their assigned transceiver/channel at different points in time. Changes to the network, when they occur, may concern all or only parts of the link profile solution set and care is taken so that the JIT process reaches the message packet's targets at least once while minimizing the total number of transmissions.

D. Access

The Access module 135 of the network node 100 is composed of an Access Controller sub-module 145 and an Access Worker sub-module per transceiver. The functionality of the Access Worker sub-modules is identical except they service different transceivers. The Access Controller sub-module 145 assigns the channels for each transceiver Access Worker sub-module based on commands received from the FA sub-module of the LM module 125. In turn, the Access Worker sub-modules may interact with a PHY layer Application Program Interface (API) that may provide transmit, receive and transceiver tuning capabilities.

The network medium access protocol can be based on Carrier Sense Multiple Access with optional Collision Avoidance (CSMA/CA). An approach to medium access using CSMA can be found in IEEE standard 802.11. Access Worker sub-modules that control an unassigned transceiver may perform the channel scanning function described elsewhere herein. Otherwise, message packets can be pulled from short queues of the transceivers by their corresponding Access Worker sub-module. The short queues of the transceivers are different from the priority queues. Pulling the message packets using an Access Worker thread allows transceivers to run CSMA/CA independently. To increase reliability in transmission, in some examples Access Worker sub-modules send broadcast packets twice.

For unicast message packets, the acknowledge (ACK) mechanism can depend on the Class of Service (CoS) assigned to the packet by the PM module 130. For Unreliable CoS, no acknowledgement is expected when sending a unicast message packet. Conversely, for the Reliable CoS, the number of transmission attempts can be configurable, which allows the sending network node to be wait-blocked waiting for an ACK. The network or system may define a promiscuous unicast transmission mode in which all neighbors keep the message packet if they receive it. Only the neighbor node specified as the unicast target node is tasked with sending an ACK frame to the promiscuous unicast transmission if requested. Transmission results can be returned to the PM module 130 for message packet disposal.

The Access module 135 may support an over-the-air QoS differentiation scheme, which allows higher priority traffic to gain quicker access to a channel. The MAC module 115 may prioritize channel access where each level of priority has a separate minimum and maximum priority contention window (e.g. a higher priority level receives a lower contention window). A back-off mechanism for each priority level may follow similar rules.

Multi-Frequency Systems

The issue of neighbor node coverage in system that uses multiple frequencies concurrently on parallel transceivers is especially acute for broadcast message traffic. For broadcast traffic, it may be desirable for the MAC module 115 to reach all one-hop destinations with as few transmissions as needed and make use of redundant links in a dynamic environment. The NbrCvr process of the PM module 130 provides coverage of next-hop targets in the frequency space. The JIT process of the PM module 130 provides temporal consistency of the target node coverage.

A. PM's NbrCvr

The PM module 130 uses the NbrCvr process to map target nodes for a message packet to a set of link profiles (called the "link profile solution set" or more simply "solution set") on which to reach the target nodes. The PM module 130 receives neighbor and link profile information from the LM module 125, including a link profile cost of each neighbor on particular communication links. The NbrCvr process can be implemented as a software module in the PM module 130 and a call to the NbrCvr process can include the list of next-hop target node identifiers (IDs). The NbrCvr process determines a link profile solution set that includes one or more communication channels that maximize coverage of the target nodes at minimized cost.

Figure 3:
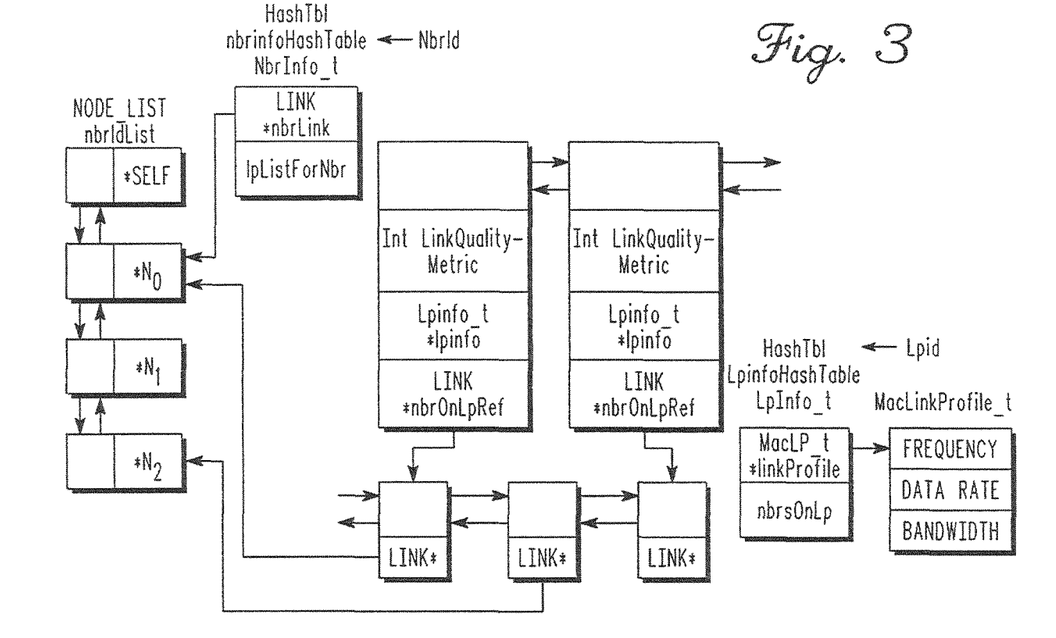
FIG. 3 shows an example of an implementation of neighbor node and link profile structures in accordance with some embodiments.

FIG. 3 shows an example of an implementation of neighbor node and link profile structures maintained by the NbrCvr process. The link profile structures can include lists of direct neighbor nodes of the network node 100, link profiles, and cross references of the link profiles that can be used to reach neighbors. Note that information on the network node 100 itself may be included in the data structures. The NbrCvr process can use a specialized greedy algorithm (described elsewhere herein) that tries to cover all target nodes for a message packet and returns the link profile solution set for the target node coverage. The link profile solution set can be stored as an array stored in memory. An example of such an array may include the following for a link profile that is at least part of the solution set: the ID of the link profile, the number of target nodes covered using the link profile, the IDs of the target nodes, the transmission mode (e.g., unicast or broadcast) of the clone message packet if the link profile is used to send a clone rather than a parent message packet, and the promiscuousness of the clone (e.g., promiscuous unicast or not).

The link profile solution set can be entered into a cache memory. This can prevent running the NbrCvr greedy algorithm over again for the same set of target nodes. The PM module 130 can check for a cached solution set before calling the NbrCvr process. The NbrCvr process of the PM module 130 may assess whether a broadcast message packet should be converted to a set of unicast or promiscuous unicast message packets. If so, the PM module 130 may clone as many copies of the parent packet as there are unicast and broadcast frames on each link profile. The PM module 130 can manage transmission of the clone message packets as communication links and target nodes change status to up and down.

1) Destinations:

A call to the NbrCvr process may specify one or more of the following: an address of a target node for a unicast message packet, a list of target nodes for a multicast message packet, a list of target nodes for a broadcast message packet, and a specific link profile ID (for no target destination).

In the case of a unicast packets and multicast packets, the NbrCvr greedy algorithm will attempt to cover the specified targets. Otherwise, for a broadcast packet, the NbrCvr process keeps track of the direct neighbors of the network node 100 to translate the packet's broadcast address destination into a list of target IDs. The NbrCvr process then treats the broadcast packet in the same manner as it would a multicast packet.

Heartbeat message packets and Hello message packets are handled differently because the link profile ID of the transmission matters more than the target destinations; some of which may be unknown. These message packets typically are transmitted according to a specific link profile that they maintain. For these packet, the NbrCvr process may bypass the coverage algorithm and simply ensure that it has the link profile ID specified by the Heartbeat or Hello in its store (e.g., memory). In this case, the NbrCvr may then return without running its coverage algorithm.

2) NbrCvr Algorithm:

The NbrCvr algorithm may start by parsing the list of target destinations and filling a neighbor node Cost Table (herein-after "Cost Table") that contains link profile coverage and link profile cost. Link profile cost can be determined using link characteristics. Some examples of link characteristics that can be used to determine link profile cost include the target node coverage and the data rate. A higher link profile cost can indicate a less desirable link profile for transmitting the message packet.

Table I is a representation of an example of a Cost Table generated by the PM module 130 and used by the NbrCvr process to determine a link profile solution set.

TABLE I

| Sec↓ | Nbrs | $N_0$ | ... | $N_n$ | AggCost | nCov |
|---|---|---|---|---|---|---|
| 0 | $LP_0$ | $C_{00}$ | ... | $C_{0n}$ | $\Sigma C_0$ | $\|C_0\|$ |
|  | $LP_1$ | $C_{10}$ | ... | $C_{1n}$ | $\Sigma C_1$ | $\|C_1\|$ |
| 1 | $LP_2$ | $C_{20}$ | ... | $C_{2n}$ | $\Sigma C_2$ | $\|C_2\|$ |

In the Table, $N_i$, ∀ i∈N, is the set of targets, which may be reached by each link profile $LP_j$; ∀ i∈N at a cost of $C_{j,i}$. A cost of $C_{j,i}=0$ means that neighbor i is not available on link profile j, ($LP_j$). The aggregate cost (AggCost) can be a function of all costs of $LP_j$ to the target nodes. In the example shown in the Table, the function is the sum of all costs, but the function could include the average cost, median cost or a cardinality to represent different network constraints. The number of targets covered by a link profile (nCov) is used to break ties that occur when the aggregate cost is determined to be the same for two or more link profiles.

A link profile can be selected according to lowest link profile cost from among unselected link profiles of the cost table. For example, the Cost Table may order the link profiles according to the link profile costs and the link profiles are examined in order according to the table. The NbrCvr algorithm can include traversing the Cost Table (e.g., iteratively) to examine each link profile and determine whether node coverage by the link profile is still needed to cover all targets. However, the NbrCvr algorithm differs from a traditional set cover greedy algorithm in which an element (here a link profile) with the maximum coverage would be selected at every iteration. This is because link characteristics such as blanket channel assignments and multiple data rates impose new constraints that preclude the NbrCvr process from using existing greedy algorithms.

In the absence of NCs and when implementing a normal blanket network interconnection, all network nodes assign one transceiver to the Blanket communication link. In this case, not only is the blanket channel expected to be more frequently used (because of availability to all nodes), a network node may reach every one of its neighbor nodes using only the Blanket link. A typical greedy algorithm would always select the link profile assigned to the Blanket link, thereby increasing contention on the Blanket channel. Therefore, an NbrCvr algorithm should recognize the network environment in which it has been implemented. The NbrCvr process considers Blanket link profiles, if available, as less desirable for packet transmission than non-Blanket (e.g., Tile or Clique) link profiles.

The Cost Table of NbrCvr can be divided into non-Blanket and Blanket sections (Sec in the Table) that can include the relevant link profiles that can represent the constraints imposed by the network. The non-Blanket section can be above the Blanket section (or otherwise placed in a position of earlier consideration). This causes, all other things being equal, any Tile or Clique link profiles to be considered first. Within the same section of a Cost Table, link profiles can be ordered according to increasing aggregate cost such that less costly links may be considered before the other links. If two link profiles happen to have the same aggregate cost, NbrCvr can use the number of neighbors reached using the link profile to break the tie.

More network nodes can be disrupted when a unicast packet is sent on a link profile connected to more neighbor nodes. On the other hand, multicast or broadcast packets may reach more target nodes if the link profile is well connected. Therefore, NbrCvr may favor link profiles with fewer neighbors for unicast packets, and favor link profiles with more neighbors for multicast and broadcast.

The NbrCvr algorithm may start with an empty link profile solution set S=∅, and may traverse the Cost Table by rows, section by section, and link profile by link profile. The selected link profile is added to the link profile solution set when the selected link profile increases the number of target nodes covered by the link profile solution set. For the case when the next lowest cost link profile examined by the NbrCvr algorithm covers at least all the neighbors already covered (e.g., the target nodes covered by the previously selected link profiles are a subset of the target nodes covered by the currently selected link profile), the link profiles currently in the link profile solution set S are dropped or otherwise removed. If the target nodes cannot all be covered using the link profiles within the section Cost Table currently being examined, the NbrCvr algorithm may advance to the next section in which it orders the link profiles. The NbrCvr process may stop once all target next-hop neighbors are covered, possibly before all the link profiles in the Cost Table have been examined. In some examples, the NbrCvr process stops when traversal of the Cost Table is completed. For this situation, the NbrCvr process may generate an indication of the target nodes not covered by the link profile solution set Whenever a link profile $LP_k$ is considered for adding to the link profile solution set S, the NbrCvr algorithm may iterate through the solution set S to look for redundant node coverage by other link profiles in the solution set. If the coverage by a link profile $LP_j \in S$ is found to be included in the coverage afforded by LPk, LPj may be purged from the solution set S. This allows redundant link profiles to be eliminated to whenever a link profile is considered to be added to the solution set S. Removing redundant link profiles can remove unnecessary packet transmissions.

3) Pseudo-Code and Example:

The Appendix includes an example of pseudo-code of an example of an NbrCvr greedy algorithm. The pseudo-code example is simplified for space and to simplify explanation. When determining whether coverage provided by a link profile is needed, the implementation of the NbrCvr algorithm makes optimizations aimed at traversing a Cost Table only once to determine a link profile solution set.

Table II is another representation of an example of a Cost Table generated by the PM module 130. Table II is an example of a Cost Table filled by a PM module 130 of a network node 100 attempting to send a packet to five neighbors {$N_0, N_1, N_2, N_3, N_4$} on four link profiles ($LP_0, LP_1, LP_2, LP_2, LP_3$).

TABLE II

| Sec↓ | Nbrs | $N_0$ | $N_1$ | $N_2$ | $N_3$ | $N_4$ | AggCost |
|---|---|---|---|---|---|---|---|
| 0 | $LP_0$ |  | 1 |  |  |  | 1 |
|  | $LP_1$ | 1 |  | 1 |  |  | 2 |
|  | $LP_2$ |  | 2 |  | 2 |  | 4 |
| 1 | $LP_3$ | 3 | 3 | 3 | 3 |  | 12 |

The Cost Table in the example includes two sections: Section 0 for Tile or Clique assignments and Section 1 for Blanket assignments. A description of operation of an NbrCvr greedy algorithm on the Cost Table follows. The notation cov(LPj) denotes target node coverage by link profile j (LPj), and cov(S) denotes target node coverage by the solution set S.

1) [Examine New Section 0] $LP_0$ brings additional coverage to (empty) solution set S: add $LP_0$ to S.
  =>={$LP_0$} and cov(S)=[0, 1, 0, 0, 0], where "1" signifies coverage of neighbor node $N_1$.
2) $LP_1$ brings additional coverage to solution set: add $LP_1$ to S.
  Iteration through S to determine redundant coverage:
  i) cov(S)−cov($LP_0$)<cov(S): keep $LP_0$ in S.
  =>S=[$LP_0$; $LP_1$] and cov(S)=[1, 1, 1, 0, 0].
3) $LP_2$ brings additional coverage to solution set: add $LP_1$ to S.
  Iteration through S:
  i) cov(S)−cov($LP_0$)=cov(S): remove $LP_0$.
  ii) cov(S)−cov($LP_1$)<cov(S): keep $LP_1$.
  =>S={$LP_1$; $LP_2$} and cov(S)=[1, 1, 1, 1, 0].
4) [Examine New Section 1] $LP_3$ brings no additional coverage to solution set S.
  =>S={$LP_1$; $LP_2$} and cov(S)=[1, 1, 1, 1, 0].

In this example, $N_4$ cannot be covered by any link profile. The NbrCvr process found the two link profiles that could cover all reachable targets at the lowest cost.

4) Solution Set Caching:

NbrCvr can be called for every packet transmission, and many of the packets are intended for the same target nodes. This may place an undue burden on the NbrCvr process to recalculate identical solution sets many times. A cache can be implemented, such as in a specified area of memory, by the NbrCvr process and the cache can be checked for valid solution sets before attempting to run through the greedy algorithm. The NbrCvr process can use a stored link profile solution set on a subsequent message packet when the target nodes of the subsequent message packet match the target nodes of the stored link profile solution set.

The cache can be indexed by a signature of the list of targets. Different target lists map to different cache entries through a hash function. To be consistent across message packets, the list of targets can be ordered by node ID so that Target nodes out of order lead to the same cache entry and same link profile solution set. When a change in the nodes that neighbor the network node occur, the cache can be flushed or otherwise cleared of link profile solution sets stored in the cache. Some examples of a change to cause a cache flush includes a neighbor node appearing or disappearing on a link profile, a fluctuation in link profile cost, etc. In effect, anytime the LM module 125 calls the NbrCvr process of the PM module 130 to modify the neighbor or link stores, the cache can be invalidated.

5) Techniques for Non-Unicast Transmissions:

Over-the-air broadcast transmissions are necessarily sent unreliably because a packet source does not know whether the packet has been successfully received by the destination nodes. The NbrCvr of the PM module 130 may include techniques to bring a higher degree of delivery reliability to broadcast transmissions. Two examples of these techniques are "broadcast branching" and "K-reliability."

a) Broadcast Branching:

A disadvantage of multicast traffic is its dependence on unreliable one-hop broadcast transmissions. Routing trees can be built such that one target (usually close to the traffic originator) is a relay node for a number (e.g., tens) of other multicast targets. When the number of one-hop targets is relatively high, the Routing tree can adjust to delivery failure since the message packet will be widely repeated. On the other hand, for a packet loss to two or three target nodes multicast traffic does not provide for packet recovery and the data cannot be delivered to the rest of the Routing tree.

Broadcast branching converts a multicast message packet sent to $N \leq \theta_B$ targets into N clones of the message packet and transmits the N clones as N promiscuous unicast packets. The PM module 130 may use $\theta_B=2$, which means that a packet intended for one or two targets will be carried by as many promiscuous unicast packets as targets. The "promiscuousness" ensures that a node keeps and processes a packet that is intended for another target.

b) K-Reliability:

The K-Reliability technique hypothesizes that multicast transmission failure occurs because most or all target nodes experience a collision with one other message packet. If a unicast packet could be sent to one of the afflicted targets, other nodes experiencing failure would benefit from the ensuing retransmission attempts. K-Reliability picks K targets from among packet's N next-hop destinations to be a proxy for the overall status of the multicast transmission. Any of the K target nodes that successfully receive the packet message initiates an acknowledge message packet. K-Reliability converts a multicast packet with N targets into min(K; N) promiscuous unicast packets, where K may be configured to any integer (e.g. some reasonable values for K are 1, 2 or 3). As described previously herein, the MAC module may attempt two transmissions for broadcast packets. A value of K=1, can cause one to two over-the-air transmissions, depending on the outcome of the first attempt. By the same logic, K=2 will match or exceed the number of transmissions of regular broadcast packets.

B. PM's JIT

1) Packet Cloning

To reach all of the target nodes of a message packet for a multicast or broadcast transmission, parent packets can be broken into multiple clones enqueued on the transceivers identified in the link profile solution set returned by the NbrCvr process. As the long queues of the transceivers fill up and become busy due to increased contention or load, the original link profile solution set for a packet coming out of the long queue may have changed, as would be common when transceivers go in and out of the busy state. The JIT process helps prevent unnecessary transmissions to network nodes that have recently become unavailable on a transceiver or for the reverse situation when a neighbor node has become available to a transceiver.

Clones of multicast packets can be particularly challenging to track. This is because they can be converted to a multitude of unicast and broadcast packets to reach their target nodes; all of which may be placed on transceivers whose queue levels vary widely. By the time a clone leaves a long queue of a transceiver, any combination of the following may have already happened: a) the original link profile to be used to transmit the clone message packet may have moved to a different transceiver; b) the target nodes of the clone message are no longer reachable from the network node 100 or must be reached by changing the transmission mode to a unicast transmission; c) a fellow clone has already covered the target nodes; d) the set of target nodes has changed and a new clone message packet is needed, etc.

The JIT process of the PM module 130 tracks the clones of an original parent message packet using information stored in a data structure that can be referred to as UserContext. The data structure can include one or more of the following:

the number of outstanding clones for the parent message packet,
a time-stamp of when a clone is placed in a long queue,
a list of pending clones for the parent message packet,
the target nodes already reached,
the transmission results of a clone, and
a pointer to the parent packet.

2) JIT Look-Up:

JIT look-up by the PM module 130 can include two core functions. The first function is to create new clones of the parent message packet if needed and can be referred to as createNewClones. The second function can be referred to as processCurrentClone and is to determine whether a clone message packet C, arriving at the bottom of a long queue of the assigned transceiver, should be left unchanged, should have the list of targets of the clone updated, or should be dropped from the queue and not transmitted. The JIT process may create a new clone message for every change that develops for the clone transmission (e.g., a change to one or both of the link profile solution set and the set of target nodes), and may drop any clones that are made obsolete by newly created clones, by changes to the link profile solution set S for a clone, or by changes in transceiver assignment.

When the clone C reaches the end of the transceiver queue, the JIT process requests an updated solution set S from the NbrCvr process for the original parent message packet. Next, the JIT process considers whether new clones are needed to reach the targets of the original message packet.

The Appendix includes a pseudo-code of an example of an algorithm for createNewClones, in the example, the JIT process iterates through every item in the link profile solution set (ssi) and checks whether each combination of targets and link profiles has already been "done" or is already pending on the correct transceiver. A combination of target node(s) and link profile LPj can be considered done if a multicast message clone has already been sent on LPj. If the combination is not done, it creates a new message packet clone destined for the link profile and target node(s) of ssi, those target nodes that have already been reached or done are removed. Any message packet clone created may then be placed or enqueued on a long transceiver queue in the manner previously described herein.

The Appendix also includes pseudo-code of an example of an algorithm for processCurrentClone. Note that the functions called within the pseudo-code examples for createNewClones and processCurrentClone can understand (e.g., receive an indication for) the distinctions between a multicast or a unicast message packet, or between a multicast or a unicast link profile solution set item and return the correct result.

Any clone being dequeued from the long transceiver queue (e.g., by reaching the end of the queue) can spawn new clones if a change in the link profile solution set requires one or more new clones; the clone being dequeued is then processed by the JIT process of the PM module 130.

In the pseudo-code example of processCurrentClone, it is determined whether the link profile and target node(s) for the clone have already been covered (e.g. a broadcast clone transmitted on the same link profile is enough to establish coverage), the link profile is excluded from the updated link profile solution set S, or if the dequeued clone itself is in a queue for an incorrect transceiver. If one or more of these conditions apply, the clone C can be simply dropped; its target node(s) covered by another pending or previously sent clone. If any of the conditions do not apply, the target node(s) for the clone C are updated using the latest link profile solution set S which has the targets already covered removed. The clone C may be dropped one last time if it has no target node to reach. Otherwise, transmission is initiated when the clone is moved to the short queue of the transceiver if the short queue is not full. If the short queue is full, the clone C remains at the bottom or end of the long queue.

Figure 4:
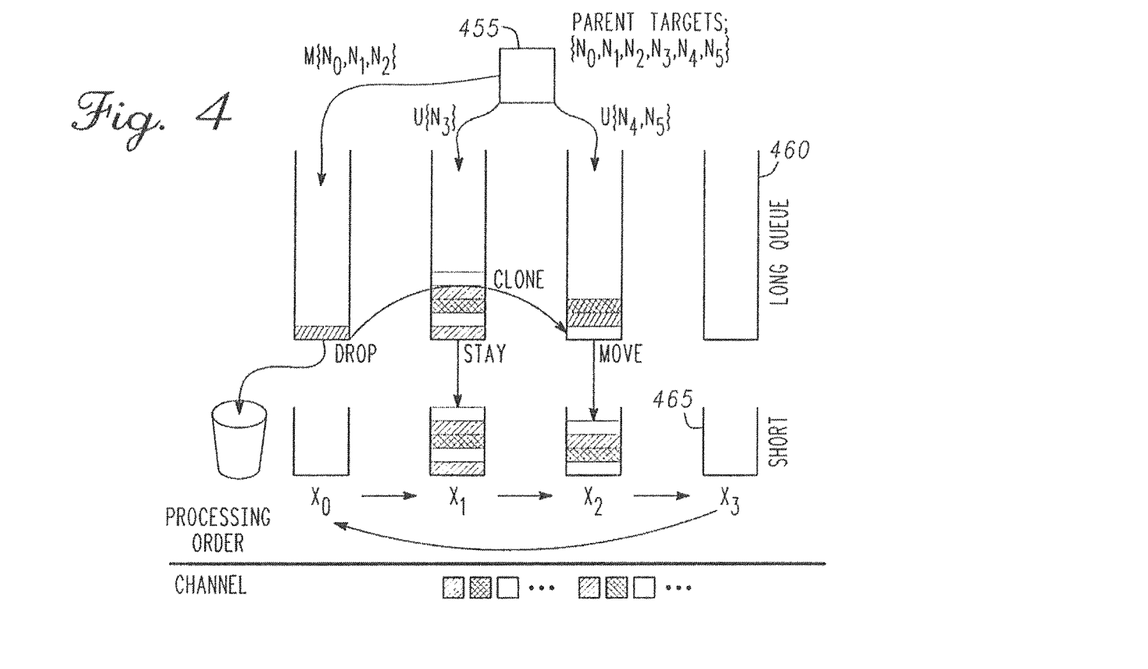
FIG. 4 shows an example of message packet clone creation and processing.

3) JIT Queue Processing:

The PM module 130 may perform JIT look-up for every clone arriving at the bottom of a long transceiver queue. FIG. 4 shows an example of clone creation and processing. In the example, a parent message packet 455 has six multicast target nodes $\{N_0, N_1, N_2, N_3, N_4, N_5\}$. To reach the target nodes, the message packet is cloned into one multicast message packet to reach target nodes $\{N_0, N_1, N_2\}$ and three unicast clones to reach the other target nodes. In the example, the message packets are enqueued using both long queues 460 and short queues of the transceivers. A message packet is moved from a long queue to a short queue if the link profile solution set for the clone is still valid when the clone reaches the end of the long queue. When a message packet enters a short queue it is transmitted when it reaches the end of the short queue without a link profile solution set being updated. When a message packet reaches the end of a short queue it is transmitted by the Access module 135 via the communication channel assigned to the transceiver.

In the example of the Figure, the multicast message $M\{N_0, N_1, N_2\}$ is placed in the long queue of transceiver $X_0$, a first unicast message $U\{N_3\}$ is placed in the long queue of transceiver $X_1$, and two additional unicast messages $U\{N_0, N_1\}$ are placed into the long queue of transceiver $X_2$. No message packet clone is paced in the long queue for transceiver $X_3$. Assume that soon after the messages are enqueued, a change in the network neighborhood to network node 100 causes the link profile solution set for the parent message packet 455 to change.

The message packet clones in the long queues may be processed in order (e.g., $X_0 \rightarrow X_1 \rightarrow X_2 \rightarrow X_3$). JIT look-up processes the clone in the long queue of transceiver $X_0$. The JIT process creates a new clone in response to the network change and the new clone is enqueued at the bottom of the long queue of transceiver $X_2$. The order of the queuing can be determined using an enqueue mechanism as described below. The clone in transceiver $X_0$ can be dropped. The JIT process then processes the message packet at the end of transceiver $X_1$. The short queue of $X_1$ is full, so the message packet remains at the bottom or end of the long queue. The JIT process then processes the message packet at the end of transceiver $X_2$, and moves the newly created clone at the bottom of the long queue to the short queue. The JIT process may then move through the long queues again because a clone has been created (the new clone was allowed to move to the short queues) or a clone has been dropped (the deleted or dropped clone has freed a spot on the long queues). The JIT process may continue to process the transceiver queues in order until no clones are dropped or added.

4) Enqueue Mechanism:

The JIT process enqueues a new clone at a queue position that reflects the time a message has already spent in the long queue. If a newly created clone were merely placed at the top of the long queue, it would put the parent message packet 455 at a disadvantage and force all new clones to wait through the long queue a second or third time. Instead, the PM module 130 may use a time-stamping mechanism to manage clone order along its queues. Long queues can be ordered by a monotonically increasing time-stamp such that a clone with a new time-stamp cannot precede an older one. Clones may be enqueued with a unique time-stamp and are placed in the queues in order of time-stamp, and not in order of time-ofenqueue. Parent packets can be given a time-stamp or assigned a range of time-stamps to be allocated to all of its clones. This ensures that every time a clone is created, it is enqueued on the long queue ahead of clones with a parent packet that came after (e.g., a younger parent packet). Within the assigned time-stamp range of the same parent packet, the clones of the same parent can be ordered according to time of creation.

Multi-Rate Systems

The network may use concurrent multiple data rates. A transceiver can allocate only one frequency at a time, but it may have more than one data rate at a time. The network node 100 can maintain Low-Data-Rate (LDR) links because they have a significantly greater range than High-Data-Rate (HDR) links, which is useful in networks with military applications. However, sending at LDR occupies the communication channel for much more time than at HDR. In itself, the maintenance of neighbor nodes on LDR links can damage the ability of large networks to fulfill their role or to even stay up.

Although the methods and example are described herein mostly in terms of multi-frequency systems, the NbrCvr process and JIT process can work equally well in multi-rate network environments. The NbrCvr process can easily be extended to support multiple data rates by placing LDR link profiles in separate sections and moving them to the higher cost section (e.g., the bottom) of the Cost Table. This means that LDR link profiles are the last to be considered by the NbrCvr greedy coverage algorithm. The NbrCvr process can define the following sections (shown here for the case of two data rates), in the following default order:

0: HDR, Non-Blanket
1: HDR, Blanket
2: LDR, Non-Blanket
3: LDR, Blanket

The section order can be modified through modification of one or both of the LM module 125 and the PM module 130.

The JIT process works regardless of multiple data rates because it functions using link profiles determined by the NbrCvr process that already discriminates between multiple data rates on the same channel frequency. As an example, assume that a neighbor node target is visible to the network node 100 on both HDR links and LDR links, but the neighbor node is moving away from the network node 100. The change in distance between the nodes may cause the HDR links to disappear. When the HDR links disappear, the JIT process causes a new link profile solution set to be created. The new link profile solution set only includes LDR link profiles and the JIT process creates clones only for LDR links and any remaining HDR clones are dropped. Thus, the JIT process provides for seamless HDR-to-LDR and LDR-to-HDR transitions.

Methods

Figure 5:
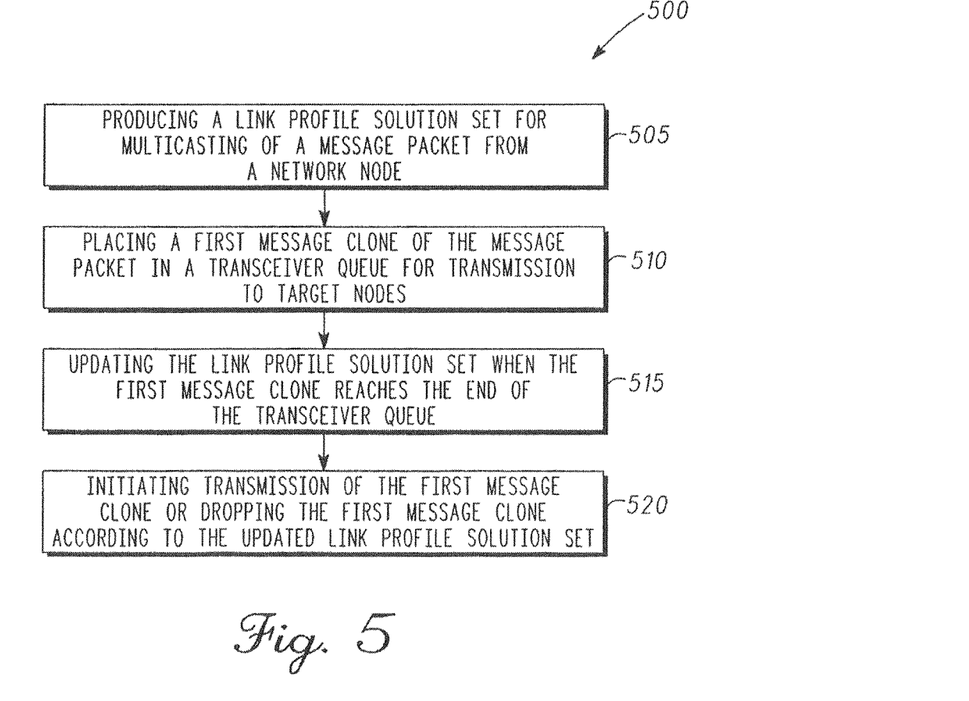
FIG. 5 is a flow diagram of operating a multi-transceiver network in accordance with some embodiments.

FIG. 5 is a flow diagram of a method 500 of operating a communication network that includes multi-transceiver network nodes. At block 505, a link profile solution set is produced for multicasting of a message packet from a network node of a communications network. A link profile is associated with a communication link available to the network node and the link profile indicates link characteristics of the communication link. The interface for the node can be determined by link maintenance using one or both of heartbeat messages and hello messages.

The link profile solution set includes a set of link profiles corresponding to a set of communication links that maximize coverage of the network target nodes of the multicast message packet. The network node includes a plurality of transceivers, and the target nodes for the message packet may be identified in a message packet previously received by the network node. In certain examples, the network node targets are for broadcasting the message packet. In certain examples, the network node targets are for unicasting the message packet.

The link profile solution set can be determined according to link profile cost using a greedy algorithm particularized for one or both of a multi-frequency and multi-data rate network. Lower cost can be accorded to a communication link with a higher data rate even though the link may not provide complete coverage to the target nodes. The link profiles of the link profile solution set are mapped to at least a portion of the plurality of transceivers. The transceivers can be assigned to communication links by packet maintenance.

At block 510, a first message clone of the message packet is placed in a transceiver priority queue for transmission to one or more of the network target nodes. The transceiver is assigned or mapped to a link profile of the link profile solution set. The queue may be a first queue of multiple priority queues of the assigned transceiver. In certain examples, the transceiver includes two queues: a long queue and a short queue, and the message clone can be placed in the long queue.

At block 515, the link profile solution set is updated when the first message clone reaches the end of the transceiver queue. At block 520, transmission of the first message clone may be initiated or the first message clone may be dropped from the queue according to the updated link profile solution set. The updated solution set may cause new clones to be created to meet new targets determined according to the updated link profile solution set. Transmission of the first message clone can be initiated by moving the message clone to a second priority queue of the transceiver.

The network node may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly. Multiple portable communication devices may be implantable into a network having a military application.

In some embodiments, the portable wireless communication device may include one or more of a keyboard, a display, a non-volatile memory port, multiple antennas, a graphics processor, an application processor, speakers, and other mobile device elements. The display may be an LCD screen including a touch screen.

In some embodiments, the network node may be a communication node for a wired communication system. The wired system can include multiple differentiable communication links between nodes that make use of multiple wired transceivers. Transmitting messages using different communication links may be associated with different costs.

The embodiments described herein may be implemented in one or a combination of hardware, firmware and software. Embodiments may also be implemented as instructions stored on a computer-readable storage device, which may be read and executed by at least one processor to perform the operations described. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

APPENDIX

NbrCvr Algorithm Pseudo-Code Example

```
nbCvrGreedy(targets):
currentSection = 1;
lpId = 0; numCvdTargets = 0;
solSet = Ø; costTable = Ø;
/*Fill cost table*/
costTable = fillCostTable(targets);
while ((numCvdTargets < numTargets) and
(currentSection < numSections)) do
    if newSection then
        /*This is a new section*/
        currentSection++;
        /*Order the section*/
        quickSort(costTable, currentSection);
    /*Find the next lp*/ ;
    lpId = nextLp(costTable, currentSection);
    if !isNeeded(solSet, lpId)) then
        /*This lp brings no new coverage*/ ;
        continue;
    if !isSolSetRedundant(solSet, lpId) then
        /*This lp brings no new coverage*/ ;
        solSet = Ø;
    insertLp(solSet, lpId);
    numCvdTargets = findNumCvdTargets(solSet);
    /*Check all lps in solSet are still needed*/ ;
    for ssLpId in solSet do
        if !isNeeded(removeLp(solSet, ssLpId), ssLpId) then
            /*lp is redundant, remove*/ ;
            solSet = removeLp(solSet, ssLpId);
```

JIT Algorithm Pseudo-Code Example

New Clone Creation

```
/*clone: Current clone on which JIT is performing look-up
solSet: Solution set returned by NbrCvr*/
createNewClones(clone, solSet):
targets = Ø;
/*Explore the sol set for new clones*/
for ssi in solSet do
    lpId = ssi →lpId;
    /*Explore every nexthop of this solSet item*/
    repeat
        /*Get target(s) on this link profile: all targets
        for multicast ssi, one at a time for unicast*/
        targets = getNextHop(ssi, targets);
        if isDone(lpId, targets) then
            /*This solSet item already done*/
            continue;
        if isPending(lpId, targets) then
            /*This solSet item already pending...*/
            cl = getPendingClone(lpId, targets);
            xcvrId = getCloneXcvrId(cl);
            newXcvrId = lpToXcvrId(lpId);
            if newXcvrId == xcvrId then
                /*... on same transceiver*/
                continue;
            /*... but on different transceiver*/
        /*Remove targets that are already done*/
        targetList = computeTargList(targets);
        if targList ≠ Ø; then
            /*This solSet item needs new clone*/
            if newCl = createNewClone(targList) then
                /* Clone created, enqueue*/
                enqueueOnLongQueue(newCl);
            else
                /*Clone creation failed*/
                handleXmitResult(FAIL);
    until no more targets on ssi
    processCurrentClone(clone, solSet);
```

JIT Algorithm Pseudo-Code Example

Processing Current Clones

```
processCurrentClone(clone, solSet):
if isDone(clone!lpId, clone→targets) then
    /*Clone is already done*/
    dropPacket(clone);
    return
if !isStillInSolSet(clone, solSet) then
    /*Clone is no longer in sol set*/
    dropPacket(clone);
    return
itemInSolSet = getMatchingItemInSolSet(clone, solSet);
itemInSolSetXcvrId = lpToXcvrId(itemInSolSet);
if itemInSolSetXcvrId == lpToXcvrId(clone) then
    /*Clone's lpId has moved to other transceiver*/
    dropPacket(clone);
    return
/*Remove targets that are already done*/
targList = computeTargList(clone→targets);
if nhList == Ø; then
    /*Clone's targets already done*/
    dropPacket(clone);
    return
/*Copy over new targets*/
clone!targets = itemInSolSet→targets;
```

What is claimed is:

1. A network node comprising:
a plurality of wireless transceivers configured to communicate concurrently using multiple frequencies, wherein the transceivers include transceiver queues dedicated to a transceiver and configured to store message packets for transmission using the transceiver; and
a controller including:
a routing module configured to determine network routes for multicasting a message packet from the network node to network target nodes; and
a packet management module configured to:
produce a link profile solution set for multicasting of a message packet from the network node to next-hop node destinations of the network routes, wherein a link profile is associated with a communication link available to the network node and indicates link characteristics of the communication link, and wherein the link profile solution set includes a set of link profiles corresponding to multiple communication links assigned to multiple transceivers of the network node that maximize coverage of the network target nodes using the next-hop node destinations;
place clones of the message packet in a plurality of transceiver queues for transmission by multiple transceivers of the network node using a plurality of transmission modes, including to place a first message clone of the message packet in a transceiver queue for transmission to one or more of the network target nodes, wherein the transceiver is assigned to a link profile of the link profile solution set;

update the clones of the message packet in the transceiver queues in response to an update of the link profile solution set;

update the link profile solution set when the first message clone reaches the end of the transceiver queue; and initiate transmission of the first message clone or drop the first message clone according to the updated link profile solution set.

2. The network node of claim 1, wherein the packet management module is configured to:

drop the first message clone from the transceiver queue when at least one of the message clone has already been sent as broadcast using the link profile, the link profile assigned to the transceiver is excluded from the updated link profile solution set, the first message clone is in a queue for an incorrect transceiver, or the message packet has been transmitted to all of the target nodes; and initiate transmission of the first message clone otherwise.

3. The network node of claim 1, wherein the packet management module is configured to:

place a plurality of message clones in one or more transceiver queues for transmission to a set of network target nodes; and create a new message clone when there is a change to the link profile solution set and a change to the set of network target nodes due to transmission of at least a portion of the plurality of message clones.

4. The network node of claim 1, wherein the packet management module is configured to, in response to the updated link profile solution set including a new link profile and target node combination, remove a message clone from the transceiver queues and create a new message clone of the message packet and place the new message clone in a queue for a transceiver assigned to the new link profile.

5. The network node of claim 4, wherein the packet management module is configured to:

assign a timestamp to a messages when the message is placed in a transceiver queue;

initiate transmission of messages in a transceiver queue in an order determined according to message timestamps;

assign a first timestamp to the first message clone when it is placed in the transceiver queue; and assign a next available timestamp to the new message clone when it is placed in the queue for the transceiver assigned to the new link profile.

6. The network node of claim 1, wherein the first message clone is a message broadcast clone, and wherein the packet management module is configured to:

update a list of network target nodes to remove network target nodes from the list that the message packet has reached;

determine the link solution set using link profiles of communication links currently available to the network node and the list of network target nodes; and remove any link profiles from the link profile solution set that correspond to a communication link that transmitted the message broadcast clone.

7. The network node of claim 1, wherein a transceiver includes a first-level transceiver queue and a second-level transceiver queue, wherein the packet management module is configured to:

place the first message clone in the first-level queue of the transceiver; and initiate transmission of the first message clone by placing the first message clone in the second-level queue of the transceiver, and wherein the transceiver is configured to transmit the first message clone when the first message clone reaches the end of the second-level transceiver queue.

8. The network node of claim 1, wherein a link profile indicates a communication link frequency, target node coverage by the communication link, and a data rate of the communication link, wherein the controller includes a link management module configured to determine a link profile cost using the target node coverage and the data rate, wherein a higher link profile cost indicates a less desirable link profile for transmitting the message packet, and wherein the packet management module is configured to determine a link profile solution set according to cost of the link profiles.

9. The network node of claim 1, wherein the packet management module is configured to form the first message clone as a multicast message clone of the message packet.

10. The network node of claim 1, wherein the packet management module is configured to form the first message clone as a unicast message clone of the message packet.

11. A system comprising:

a communication network including a first network node and a plurality of nodes that neighbor the first network node, wherein the first network node includes:

a plurality of wireless transceivers configured to communicate concurrently using multiple frequencies, wherein the transceivers include transceiver queues dedicated to a transceiver and configured to store message packets for transmission using the transceiver; and a controller including:

a routing module configured to determine network routes for multicasting a message packet from the network node to network target nodes; and a packet management module configured to:

produce a link profile solution set for multicasting of a message packet from the network node to next-hop node destinations of the network routes, wherein a link profile is associated with a communication link available to the network node and indicates link characteristics of the communication link, and wherein the link profile solution set includes a set of link profiles corresponding to multiple communication links assigned to multiple transceivers of the network node that maximize coverage of the network target nodes using the next-hop node destinations;

place clones of the message packet in a plurality of transceiver queues for transmission by multiple transceivers of the network node using a plurality of transmission modes, including to place a first message clone of the message packet in a transceiver queue for transmission to one or more of the network target nodes, wherein the transceiver is assigned to a link profile of the link profile solution set;

update the clones of the message packet in the transceiver queues in response to an update of the link profile solution set;

update the link profile solution set when the first message clone reaches the end of the transceiver queue; and initiate transmission of the first message clone or drop the first message clone according to the updated link profile solution set.

12. The system of claim 11, wherein the packet management module is configured to:

drop the first message clone from the transceiver queue when at least one of the message clone has already been sent using broadcast on the link profile, the link profile assigned to the transceiver is excluded from the updated link profile solution set, the first message clone is in a queue for an incorrect transceiver, or the message packet has been transmitted to all of the target neighbor nodes; and initiate transmission of the first message clone otherwise.

13. The system of claim 11, wherein the packet management module is configured to:

create a new message clone of the message packet when the updated link profile solution set includes a new link profile and target neighbor node combination; and place the new message clone in a queue for a transceiver assigned to the new link profile.

14. A method comprising:

determining network routes for multicasting a message packet from a network node to network target nodes of a wireless communication network, wherein the network node includes a plurality of transceivers configured to communicate concurrently using multiple frequencies;

producing a link profile solution set for multicasting of a message packet from the network node to next-hop node destinations of the network routes, wherein a link profile is associated with a communication link available to the network node and indicates link characteristics of the communication link, and wherein the link profile solution set includes a set of link profiles corresponding to multiple communication links assigned to multiple transceivers of the network node that maximize coverage of the network target nodes using the next-hop node destinations;

placing clones of the message packet in a plurality of transceiver queues for transmission by the plurality of transceivers of the network node using a plurality of transmission modes, including placing a first message clone of the message packet in a transceiver queue for transmission to one or more of the network target nodes, wherein the transceiver is assigned to a link profile of the link profile solution set;

updating the clones of the message packet in the plurality of transceiver queues in response to a change of the link profile solution set;

updating the link profile solution set when the first message clone reaches the end of the transceiver queue; and initiating transmission of the first message clone or dropping the first message clone according to the updated link profile solution set.

15. The method of claim 14, wherein initiating transmission or dropping the first message clone includes:

dropping the first message clone from the transceiver queue when at least one of the message clone has already been sent as broadcast using the link profile, the link profile assigned to the transceiver is excluded from the updated link profile solution set, the first message clone is in a queue for an incorrect transceiver, or the message packet has been transmit to all of the target nodes; and initiating transmission of the first message clone otherwise.

16. The method of claim 14, wherein placing a first message clone in a transceiver queue includes placing a plurality of message clones in one or more transceiver queues for transmission to a set of network target nodes; and wherein the method includes removing at least one message clone from the one or more transceiver queues and creating a new message clone when there is a change to the link profile solution set and a change to the set of network target nodes due to transmission of at least a portion of the plurality of message clones.

17. The method of claim 14, including:

removing a message clone from the transceiver queues and creating a new message clone of the message packet when the updated link profile solution set includes a new link profile and target node combination, and when the network target nodes have not been covered; and placing the new message clone in a queue for a transceiver assigned to the new link profile.

18. The method of claim 17, wherein placing the first message clone in the transceiver queue includes assigning a range of timestamps to message clones, and wherein the new message clone is assigned a timestamp within the assigned range, and wherein an order of transmission of messages in the transceiver queue is determined according to timestamps of the messages.

19. The method of claim 14, wherein updating the link profile solution set includes:

updating the network target nodes to remove any network target nodes that the message packet has reached;

determining the updated link profile solution set using link profiles of communication links currently available to the network node, originating node and remaining target nodes; and removing any link profiles from the link profile solution set that correspond to a communication link that transmitted a broadcast clone.

20. The method of claim 14, wherein placing a first message clone of the message packet in a transceiver queue includes placing the first message clone in a first-level queue of the transceiver, and wherein initiating transmission of the first message clone includes placing the first message clone in a second-level queue of the transceiver and transmitting the first message clone when the first message clone reaches the end of the second-level transceiver queue.

* * * * *